US008683468B2

(12) United States Patent
Breternitz et al.

(10) Patent No.: US 8,683,468 B2
(45) Date of Patent: *Mar. 25, 2014

(54) AUTOMATIC KERNEL MIGRATION FOR HETEROGENEOUS CORES

(75) Inventors: Mauricio Breternitz, Austin, TX (US);
Patryk Kaminski, Austin, TX (US);
Keith Lowery, Bothell, WA (US);
Anton Chernoff, Harvard, MA (US);
Dz-Ching Ju, Saratoga, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 13/108,438

(22) Filed: May 16, 2011

(65) Prior Publication Data
US 2012/0297163 A1 Nov. 22, 2012

(51) Int. Cl.
*G06F 9/46* (2006.01)
(52) U.S. Cl.
USPC ............ 718/100; 718/102; 718/104; 718/105
(58) Field of Classification Search
None
See application file for complete search history.

(56) References Cited

U.S. PATENT DOCUMENTS

| 6,078,944 | A | 6/2000 | Enko et al. |
| 6,345,041 | B1 | 2/2002 | Kimball et al. |
| 6,480,930 | B1 | 11/2002 | Zakai et al. |
| 6,560,717 | B1 | 5/2003 | Scott et al. |
| 2005/0251667 | A1* | 11/2005 | Iwamoto ........................ 712/233 |
| 2007/0283358 | A1* | 12/2007 | Kasahara et al. ............. 718/104 |
| 2009/0165014 | A1* | 6/2009 | Park ............................... 718/105 |
| 2009/0222654 | A1* | 9/2009 | Hum et al. ..................... 713/100 |
| 2009/0313507 | A1* | 12/2009 | Swaine et al. ................... 714/38 |
| 2010/0077236 | A1* | 3/2010 | Trautman et al. ............. 713/300 |
| 2010/0153959 | A1* | 6/2010 | Song et al. ..................... 718/104 |
| 2011/0213934 | A1* | 9/2011 | Greenhalgh et al. .......... 711/146 |
| 2011/0246998 | A1* | 10/2011 | Vaidya et al. ................. 718/103 |
| 2011/0289507 | A1* | 11/2011 | Khan et al. .................... 718/104 |
| 2012/0079501 | A1* | 3/2012 | Sandstrom .................... 718/105 |
| 2012/0291040 | A1* | 11/2012 | Breternitz et al. ............ 718/104 |

OTHER PUBLICATIONS

Vinay G Vaidya et al: 11 Dynamic scheduler for multi-core systems 11, Software Technology and Engineering (ICSTE), 2010 2nd International Conference on, IEEE, Piscataway, NJ, USA, Oct. 3, 2010, pp. V1-13, XP031780289, ISBN: 978-1-4244-8667-0.

(Continued)

*Primary Examiner* — Emerson Puente
*Assistant Examiner* — Charles Swift
(74) *Attorney, Agent, or Firm* — Rory D. Rankin; Meyertons, Hood, Kivlin, Kowert & Goetzel, P.C.

(57) ABSTRACT

A system and method for automatically migrating the execution of work units between multiple heterogeneous cores. A computing system includes a first processor core with a single instruction multiple data micro-architecture and a second processor core with a general-purpose micro-architecture. A compiler predicts execution of a function call in a program migrates at a given location to a different processor core. The compiler creates a data structure to support moving live values associated with the execution of the function call at the given location. An operating system (OS) scheduler schedules at least code before the given location in program order to the first processor core. In response to receiving an indication that a condition for migration is satisfied, the OS scheduler moves the live values to a location indicated by the data structure for access by the second processor core and schedules code after the given location to the second processor core.

18 Claims, 11 Drawing Sheets

(56) References Cited

OTHER PUBLICATIONS

Howard Jay Siegel et al: "Heterogeneous Computing" Dec. 1, 1994 (1994-12-81)~XP55834473~Retrieved from the Internet: URL:http://docs.lib.purdue.edujcgijviewcontent.cgi?article=1289 &context=ecetr [retrieved on 2812-88-81] p. 2~line 1-p. 4~line 17 p. 55~line 2-line 11.

International Search Report and Written Opinion in application No. PCT/US2012/038057 mailed Aug. 9, 2012.

\* cited by examiner

```
Code 210 void DoWorkA(Record * record)
{
    // perform steps of a  first algorithm
    // on the record
} void DoWorkB(Record * record)
{
    // perform steps of a  second algorithm
    // on the record
} void KernelFunction(Record * recordsArray)
{
    const int unitId = get_global_Id(0);

DoWorkA(&recordsArray[unitId]);

DoWorkB( &recordsArray[unitId]);
}
```

```
Code 220

INPUT = [1, 3, 2, 7, 8,
         1, 3, 5, 2, 4]

KERNEL Power2(INPUT,
RESULT) {
    N = get_global_Id();
    V = INPUT[N];
    RESULT[N] = V * V;
}
```

FIG. 2

```
                                                    Code 230
void DoWorkA(Record * record)
{
   // perform steps of a  first algorithm
   // on the record
} void DoWorkB(Record * record)
{
   // perform steps of a  second algorithm
   // on the record
} void KernelFunction(Record * recordsArray)
{
   const int unitId = get_global_Id(0);
   If (EvaluateFunction(recordsArray[unitId])
   {
      DoWorkA(&recordsArray[unitId]);
   }
   else
   {
      DoWorkB( &recordsArray[ unitId]);
   }
}
```

FIG. 3

```
Code 800
int f (int arg) { ... } int g(int arg){_} kernel foo ( global int input *, // input array local int tmp*, // local global int output *) // result array { int id = get_local_id( ... );

int local_temp = 0;

tmp[id] input [id] ;

secondary_entry:

do { tmp[id] = f( input [id] );

local_temp = f( tmp[id], local_temp);

} while ( g(input[id]) ) ;

output [id] = h(local_temp);

AUTOMATIC KERNEL MIGRATION FOR HETEROGENEOUS CORES

BACKGROUND OF THE INVENTION

1. Field of the Invention

This invention relates to computing systems, and more particularly, to automatically migrating the execution of work units between multiple heterogeneous cores.

2. Description of the Relevant Art

The parallelization of tasks is used to increase the throughput of computer systems. To this end, compilers may extract parallelized tasks from program code to execute in parallel on the system hardware. With a single-core architecture, a single core may include deep pipelines configured to perform multithreading. To further increase parallel execution on the hardware, a multi-core architecture may include multiple general-purpose cores. This type of architecture may be referred to as a homogeneous multi-core architecture. This type of architecture may provide higher instruction throughput than a single-core architecture.

Some software applications may not be divided frequently into parallel tasks. In addition, specific tasks may not efficiently execute on a general-purpose core. Particular instructions for a computational intensive task may cause a disproportionate share of a shared resource, which delays a deallocation of the shared resource. Examples of such specific tasks may include cryptography, video graphics rendering and garbage collection.

To overcome the performance limitations of conventional general-purpose cores, a computer system may offload specific tasks to special-purpose hardware. This hardware may include a single instruction multiple data (SIMD) parallel architecture, a field-programmable gate array (FPGA), and other specialized cores. A type of architecture with different types of cores may be referred to as a heterogeneous multi-core architecture. Depending on the scheduling of tasks, this type of architecture may provide higher instruction throughput than a homogeneous multi-core architecture.

In many cases, particular software applications have data parallelism in which the execution of each work item, or parallel function call, is data dependent within itself. For example, a first work item may be data independent from a second work item, and each of the first and the second work items are scheduled on separate paths within a core with a SIMD micro-architecture. However, an amount of instructions executed within each of the first and the second work items may be data-dependent. A conditional test implemented as a branch instruction may pass for the first work item, but fail for the second work item dependent on the data for each work item.

The efficiency of parallel execution may be reduced as the second work item halts execution and waits as the first work item continues with its ongoing execution. The inefficiency grows when only a few work items continue execution due to passed tests whereas most of the work items are idle due to failed tests. After efficient, functionality-matching assignment of the work items by an OS scheduler in a heterogeneous multi-core architecture, system performance may still be reduced due to the data-dependent behavior of particular software applications.

SUMMARY OF EMBODIMENTS OF THE INVENTION

Systems and methods for automatically migrating the execution of work units between multiple heterogeneous cores are contemplated.

In one embodiment, a computing system includes a first processor core with a first micro-architecture and a second processor core with a second micro-architecture different from the first micro-architecture. In one embodiment, the first micro-architecture is a single instruction multiple data (SIMD) micro-architecture and the second micro-architecture is a general-purpose micro-architecture. The computing system includes a memory coupled to each of the first and the second processor cores. The memory stores a computer program comprising one or more compute kernels, or function calls. As a compiler traverses the instructions of a given function call, the compiler is configured to predict execution of the function call migrates at a given location to a different processor core. The compiler creates a data structure to support moving live values associated with the execution of the function call at the given location. Such live values may be referred to as a "context".

A scheduler within an operating system (OS) schedules at least code before the given location in program order to the first processor core. In response to receiving an indication that a condition for migration is satisfied, the OS scheduler moves the live values to a location indicated by the data structure for access by the second processor core and schedules code after the given location in program order to the second processor core. In order to determine whether a migration condition is satisfied, each of the first and the second processor core is configured to determine whether a number of parallel executing iterations of the function call that have reached an exit point is above a given threshold.

These and other embodiments will be further appreciated upon reference to the following description and drawings.

BRIEF DESCRIPTION OF THE DRAWINGS

FIG. 2 is a generalized block diagram of one embodiment of source code utilizing compute kernels.

FIG. 3 is a generalized block diagram of one embodiment of source code defining compute kernels with conditional statements.

FIG. 8 is a generalized block diagram of one embodiment of program code with a migration tagged branch.

Figure 1:
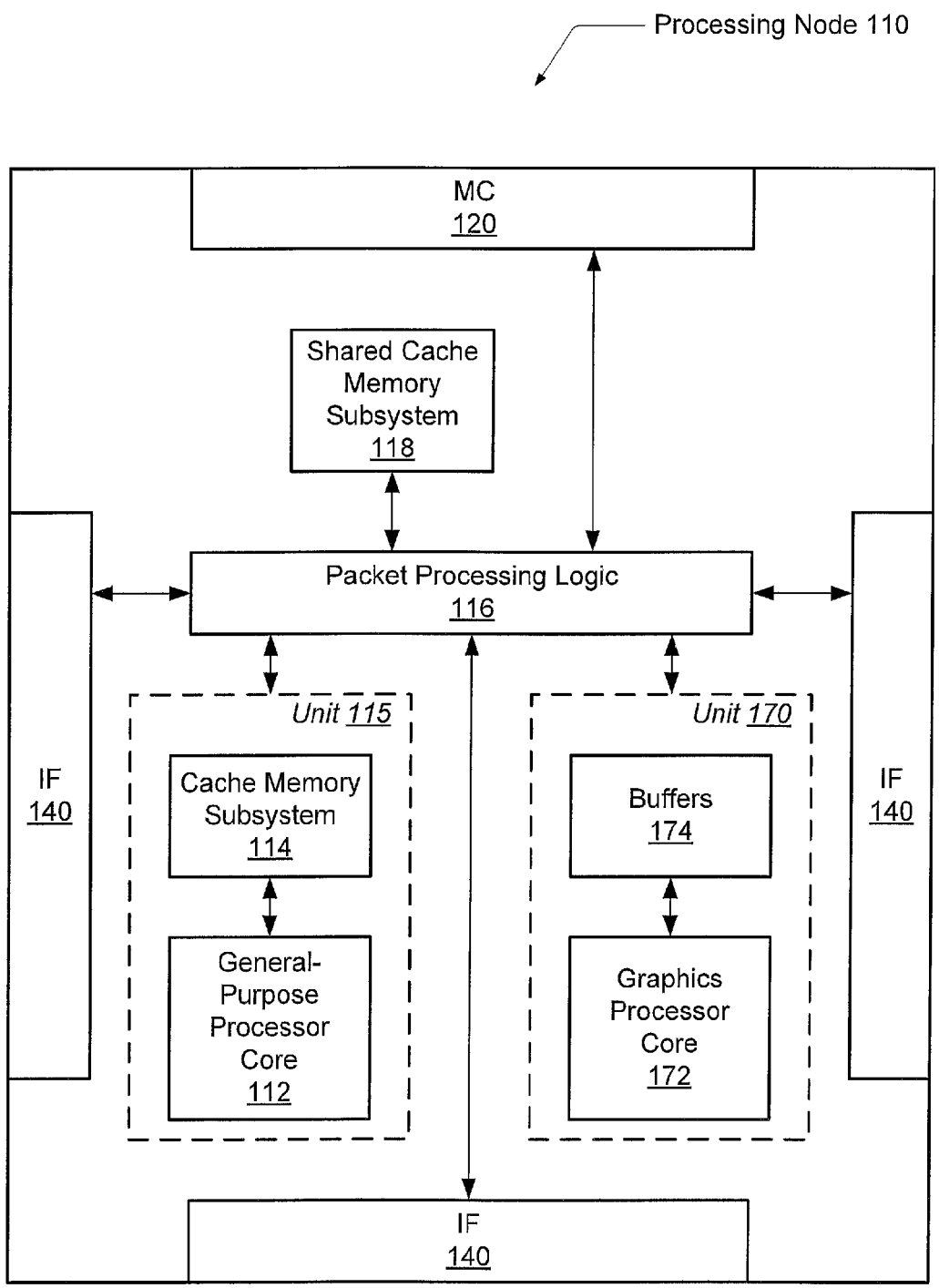
FIG. 1 is a generalized block diagram of one embodiment of an exemplary processing node with a heterogeneous multi-core architecture.

While the invention is susceptible to various modifications and alternative forms, specific embodiments are shown by way of example in the drawings and are herein described in detail. It should be understood, however, that drawings and detailed description thereto are not intended to limit the

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, one embodiment of an exemplary processing node 110 with a heterogeneous multi-core architecture is shown. Processing node 110 may include one or more processing units 115, which may include one or more processor cores 112 and an associated cache memory subsystem 114. In one embodiment, processor core 112 utilizes a general-purpose micro-architecture.

Processing node 110 may also include one or more processing units 170, which may comprise one or more processor cores 172 and data storage buffers 174. Processor core 172 may not be a mirrored silicon image of processor core 112. Processor core 172 may have a micro-architecture different from the micro-architecture used by processor core 112. In one embodiment, the processor core 172 may be a different generation of a same processor family as processor core 112. In another embodiment, the processor core 172 may be a voltage and/or frequency scaled version of processor core 112. In other words, the processor core 172 is not a silicon copy of the processor core 112 with a same functionality and instruction set architecture (ISA), a same clock frequency, same cache sizes, a same memory model, and so forth.

Continuing with the micro-architecture of processor core 172, in yet another embodiment, the processor core 172 may comprise a micro-architecture that provides high instruction throughput for a computational intensive task. Processor core 172 may have a parallel architecture. For example, the processor core 172 may be a single instruction multiple data (SIMD) core. Examples of SIMD cores include graphics processing units (GPUs), digital signal processing (DSP) cores, or other. In one embodiment, the processing node 110 comprises a single instruction set architecture (ISA). Typically, as is well known in the art, single-ISA multi-core architectures have been shown to provide higher power and throughput performances for chip multiprocessors (CMP).

High instruction throughput on processing node 110 may be achieved with measured power consumption within a given power limit when threads of software applications are efficiently scheduled. The threads may be scheduled on one of processor cores 112 and 172 in a manner that each thread has the highest instruction throughput based at least in part on the runtime hardware resources of the processor cores 112 and 172.

Continuing with the components in the processing node 110, the processing node 110 may include memory controller 120, and interface logic 140. In one embodiment, the illustrated functionality of processing node 110 is incorporated upon a single integrated circuit. In one embodiment, processor cores 112 include circuitry for executing instructions according to a predefined general-purpose instruction set. For example, the SPARC® instruction set architecture (ISA) may be selected. Alternatively, the x86, x86-64®, Alpha®, PowerPC®, MIPS®, PA-RISC®, or any other instruction set architecture may be selected. Generally, processor core 112 accesses the cache memory subsystems 114, respectively, for data and instructions. If the requested block is not found in cache memory subsystem 114 or in shared cache memory subsystem 118, then a read request may be generated and transmitted to the memory controller within the node to which the missing block is mapped.

In one embodiment, processing unit 170 is a graphics processing unit (GPU). Modern GPUs are very efficient at manipulating and displaying computer graphics. The highly parallel structure of GPUs makes them more effective than general-purpose central processing units (CPUs), such as processing unit 115, for a range of complex algorithms. Typically, a GPU executes calculations used for graphics and video and a CPU executes calculations for many more system processes than graphics alone. Conventional GPUs utilize very wide single instruction multiple data (SIMD) architectures to achieve high throughput in image-rendering applications. Such applications generally entail executing the same programs, such as vertex shaders or pixel shaders, on large numbers of objects (vertices or pixels). Since each object is processed independently of other objects, but the same sequence of operations is used, a SIMD micro-architecture provides considerable performance enhancement. GPUs have also been considered for non-graphical calculations.

In one embodiment, the GPU 170 may be located on a video card. In another embodiment, the GPU 170 may be integrated on the motherboard. In yet another embodiment, the illustrated functionality of processing node 110 may be incorporated upon a single integrated circuit. In such an embodiment, the CPU 115 and the GPU 170 may be proprietary cores from different design centers. Also, the GPU 170 may now be able to directly access both local memories 114 and 118 and main memory via memory controller 120 from the processing node 110, rather than perform memory accesses off-chip via interface 140. This embodiment may lower latency for memory accesses for the GPU 170, which may translate into higher performance.

Continuing with the components of processing node 110 in FIG. 1, cache subsystems 114 and 118 may comprise high-speed cache memories configured to store blocks of data. Cache memory subsystems 114 may be integrated within respective processor cores 112. Alternatively, cache memory subsystems 114 may be coupled to processor cores 114 in a backside cache configuration or an inline configuration, as desired. Still further, cache memory subsystems 114 may be implemented as a hierarchy of caches. Caches that are located nearer processor cores 112 (within the hierarchy) may be integrated into processor cores 112, if desired. In one embodiment, cache memory subsystems 114 each represent L2 cache structures, and shared cache subsystem 118 represents an L3 cache structure. Both the cache memory subsystem 114 and the shared cache memory subsystem 118 may include a cache memory coupled to a corresponding cache controller.

Generally, packet processing logic 116 is configured to respond to control packets received on the links to which processing node 110 is coupled, to generate control packets in response to processor cores 112 and/or cache memory subsystems 114, to generate probe commands and response packets in response to transactions selected by memory controller 120 for service, and to route packets for which node 110 is an intermediate node to other nodes through interface logic 140. Interface logic 140 may include logic to receive packets and synchronize the packets to an internal clock used by packet processing logic 116.

Tuning now to FIG. 2, one embodiment of source code utilizing compute kernels is shown. OpenCL™ (Open Computing Language) is one example of a low-level application programming interface (API) for heterogeneous computing. OpenCL includes a C-like language that defines execution queues, wherein each queue is associated with an OpenCL device. An OpenCL device may be a CPU, a GPU, or other unit with at least one processor core within the heterogeneous multi-core architecture. A function call may be referred to as an OpenCL kernel, or simply a "compute kernel". The OpenCL framework may improve computing performance for a wide variety of data-parallel applications used in gaming, entertainment, science and medical fields. For a heterogeneous architecture, a computer program typically comprises a collection of compute kernels and internal functions. A software programmer may define the compute kernels, whereas the internal functions may be defined in a given library.

For a data-parallel software application, an N-Dimensional computation domain may define an organization of an "execution domain". The N-Dimensional computation domain may also be referred to as an N-Dimensional grid or an N-Dimensional Range ("NDRange"). The NDRange may be a one-, two-, or three-dimensional space. Note that some embodiments may allow more than three-dimensional data. This dimensional space may also be referred to as an index space. For example, a software application may perform data processing on a two-dimensional (2D) array of data, such as an image file. The software application may perform an algorithm developed by a software programmer on a pixel-by-pixel basis of a 2D image or an element-by-element basis of a two-dimensional matrix. A given compute kernel may be invoked over the index space (the NDRange). In other embodiments, a software application may include an algorithm that utilizes data-parallel programming for electrostatic potentials mapping on a 3D lattice and direct coulomb summation used in macromolecular modeling.

Typically after compilation, the arguments and parameters of each compute kernel are set. Additionally, associated memory objects and buffers are created. A given instance of the compute kernel may be executed as its own software thread. However, a compute kernel may include control flow transfer instructions that create forks, whereas a fork in a computer program typically creates a software thread, by common definition. A given instance of the compute kernel at a given point in the index space may be referred to as a "work item". A work item may also be referred to as a work unit. A work unit may operate with the one or more instructions in the compute kernel on a record of data corresponding to a given pixel (a given index) of the 2D image. Typically, work units have an associated unique identifier (ID). In another example, an introductory computer program processing the string "Hello World" may have one work unit for computing each letter in the string.

The NDRange may define a total number of work units that execute in parallel if there is sufficient hardware support. For example, the NDRange may define a number of 280 work units, but a GPU may support the simultaneous execution of 64 work units at any given time. The total number of work units may define a global work size. As is well known to those skilled in the art, the work units may be further grouped into work groups. Each work group may have a unique identifier (ID). The work units within a given work group may be able to communicate with each other and synchronize execution and coordinate memory accesses. A number of work units may be clustered into a wave front for simultaneous execution on a GPU in a SIMD manner. Regarding the example above for 280 total work units, a wave front may include 64 work units.

The OpenCL framework is an open programming standard for various compute thereby improving code portability. Other frameworks are available and may offer more vendor-specific coding for heterogeneous architectures. For example, NVIDIA offers Compute Unified Device Architecture (CUDA®) and AMD offers ATI Stream®. With a CUDA framework, a compute kernel is typically statically compiled when the computer program is compiled. With an OpenCL framework, a compute kernel is typically compiled with a Just-In-Time (JIT) method. The JIT method may generate an appropriate binary code after obtaining the system configuration. With a JIT compilation method, the compilation time is included with the total execution time. Therefore, compiler optimizations may increase the execution time. In addition, at run time the OpenCL compiler may generate multiple versions of compute kernels. One version of a compute kernel may be generated for each type of OpenCL device type, such as a general-purpose CPU, a SIMD GPU, and so forth.

The two frameworks, OpenCL and CUDA, have a difference in terminology between their respective execution models. For example, a work unit, a work group, a wave front and an NDRange in OpenCL have corresponding terms in CUDA such as a thread, a thread block, a warp and a grid. Throughout the rest of the description, the terms corresponding to OpenCL are used. However, the systems and methods described may apply to CUDA, ATI Stream and other frameworks.

As shown in FIG. 2, code 210 defines two function calls generally titled "doWorkA" and "doWorkB". Each function call may be referred to as a "compute kernel". A compute kernel may be matched with one or more records of data to produce one or more work units of computation. Therefore, two or more work units may utilize the same instructions of the single function call, but operate on different records of data. For example, the function call "Power2" in code 220 may be used to execute 10 work units, one for each data value in the array "INPUT". Here, a record comprises a single data value. In other examples, a record may comprise two or more fields, wherein each field includes a data value. A SIMD micro-architecture may efficiently execute the instructions of the kernel "Power2", calculate the power of 2 for the values in the INPUT array and write the output to the RESULT array.

The OpenCL framework may invoke an instance of a compute kernel multiple times in parallel. Each call to the compute kernel has one associated unique ID (a work unit ID) that may be fetched by calling an internal function named get_global_id(0). Regarding the above example in code 220, the compute kernel "Power2" is invoked once for each data value in the INPUT array. In this case, the compute kernel "Power2" is invoked 10 times. Accordingly, ten unique work unit IDs are fetched. With a JIT compiling method, these instances are invoked at runtime. The OpenCL framework may differentiate between these different instances by utilizing the unique work unit IDs. The data to be operated on (a record) may also be specified, such as a specific data value in the INPUT array. Therefore, at runtime, a work unit may be scheduled by default to the same OpenCL device as the associated compute kernel is scheduled.

Turning now to FIG. 3, one embodiment of source code defining compute kernels with conditional statements is shown. Similar to code 210, the code 230 shown in FIG. 3 defines two function calls generally titled "doWorkA" and "doWorkB". Again, each function call may be referred to as a "compute kernel". Here, only one of the two compute kernels is executed during runtime. The selection of which compute kernel is executed is based on a conditional test provided by the function call "EvaluateFunction". A result of a given instruction or whether the given instruction is executed is data-dependent on the execution of previous instructions and data corresponding to an associated record. If the result of the conditional test is not consistent among a wave front of work units, the benefits of a SIMD micro-architecture may be reduced. For example, a given SIMD core may have 64 parallel computation units available for simultaneous execution of 64 work units. However, if half of the 64 work units pass the conditional test while the other half fails the conditional test, then only half of the parallel computation units are utilized during a given stage of processing.

Figure 4:
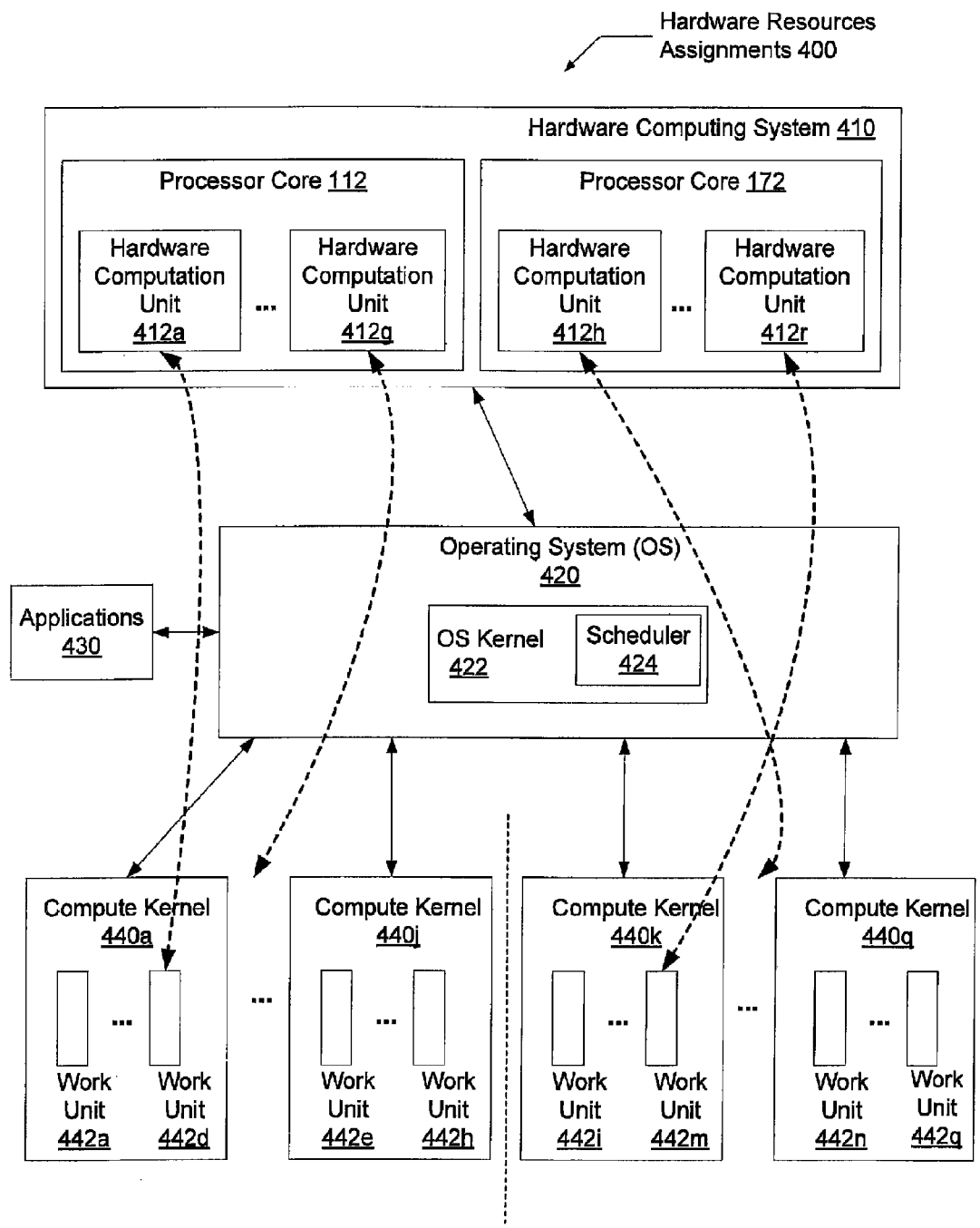
FIG. 4 is a generalized block diagram of one embodiment of scheduled assignments between hardware resources and compute kernels.

Turning now to FIG. 4, a generalized block diagram illustrating one embodiment of scheduled assignments 400 between hardware resources and compute kernels is shown. Here, the partitioning of hardware and software resources and their interrelationships and assignments during the execution of one or more software applications 430 is shown. In one embodiment, an operating system 420 allocates regions of memory for compute kernels 440a-440j and 440k-440q. When applications 430, or computer programs, execute, each application may comprise multiple compute kernels. For example, a first executing application may comprise compute kernels 440a-440j and a second executing application may comprise compute kernels 440k-440q. Each one of the kernels 440a-440q may be used to generate one or more work units by being combined with one or more records of data (not shown). For example, compute kernel 440a may produce work units 442a-442d, compute kernel 440j may produce work units 442e-442h, compute kernel 440k may produce work units 442j-442m and compute kernel 440q may produce work units 442n-442q. A work unit may execute independently of other work units and execute concurrently with other work units.

Each of the compute kernels shown in FIG. 4 may own its own resources such as an image of memory, or an instance of instructions and data before application execution. Each of the compute kernels may also comprise process-specific information such as address space that addresses the code, data, and possibly a heap and a stack; variables in data and control registers such as stack pointers, general and floating-point registers, program counter, and otherwise; operating system descriptors such as stdin, stdout, and otherwise; and security attributes such as a set of permissions.

In one embodiment, hardware computing system 410 incorporates a general-purpose processor core 112 and a SIMD processor core 172, each configured to process one or more work units. In another embodiment, system 410 includes two other heterogeneous processor cores. In general, for a given application, operating system 420 sets up an address space for the application, loads the application's code into memory, sets up a stack for the program, branches to a given location inside the application, and begins execution of the application. Typically, the portion of the operating system 420 that manages such activities is the operating system (OS) kernel 422. The OS kernel 422 is referred to as "OS kernel" in order not to confuse it with a compute kernel, or a function call. The OS kernel 422 may further determine a course of action when insufficient memory is available for the execution of the application. As stated before, an application may be divided into more than one compute kernel and system 410 may be running more than one application. Therefore, there may be several compute kernels running in parallel. The OS kernel 422 may decide at any time which of the simultaneous executing compute kernels is allocated to the processor cores 112 and 172. The OS kernel 422 may allow a process to run on a core of a processor, which may have one or more cores, for a given amount of time referred to as a time slice. An OS scheduler 424 in the operating system 420 may comprise decision logic for assigning compute kernels to cores.

In one embodiment, only one compute kernel can execute at any time on any one of the hardware computation units 412a-412g and 412h-412r. These hardware computation units comprise hardware that can handle the execution of a given instruction of a given work unit with associated data. This hardware may include an arithmetic logic unit that is configured to perform addition, multiplication, zero detect, a bit-wise shift, division, video graphics and multimedia instructions or other operations known to those skilled in the art of processor design. These hardware computation units may include a hardware thread in a multi-threaded processor, a parallel hardware column in a SIMD micro-architecture, and so forth.

The dashed lines in FIG. 4 denote assignments and do not necessarily denote direct physical connections. Thus, for example, hardware computation unit 412a may be assigned to execute work unit 442d. However, later (e.g., after a context switch), the hardware computation unit 412a may be assigned to execute work unit 442h. In one embodiment, the OS scheduler 424 may schedule the work units 442a-442q to the hardware computation units 412a-412r with a round-robin scheme. Alternatively, the OS scheduler 424 may schedule the work units 442a-442q to the cores 112 and 172 with a round-robin scheme. An assignment of a given work unit to a given hardware computation unit may be performed by an associated processor core. In another embodiment, the OS scheduler 424 may perform the scheduling based on availability of the processor cores 112 and 172. In yet another embodiment, the OS scheduler 424 may perform the scheduling according to assignments created by a programmer utilizing the OpenCL™ API or another similar API. These scheduling schemes may restrict portability and performance when there is a mismatch between the work unit assignments and hardware resources.

Figure 5:
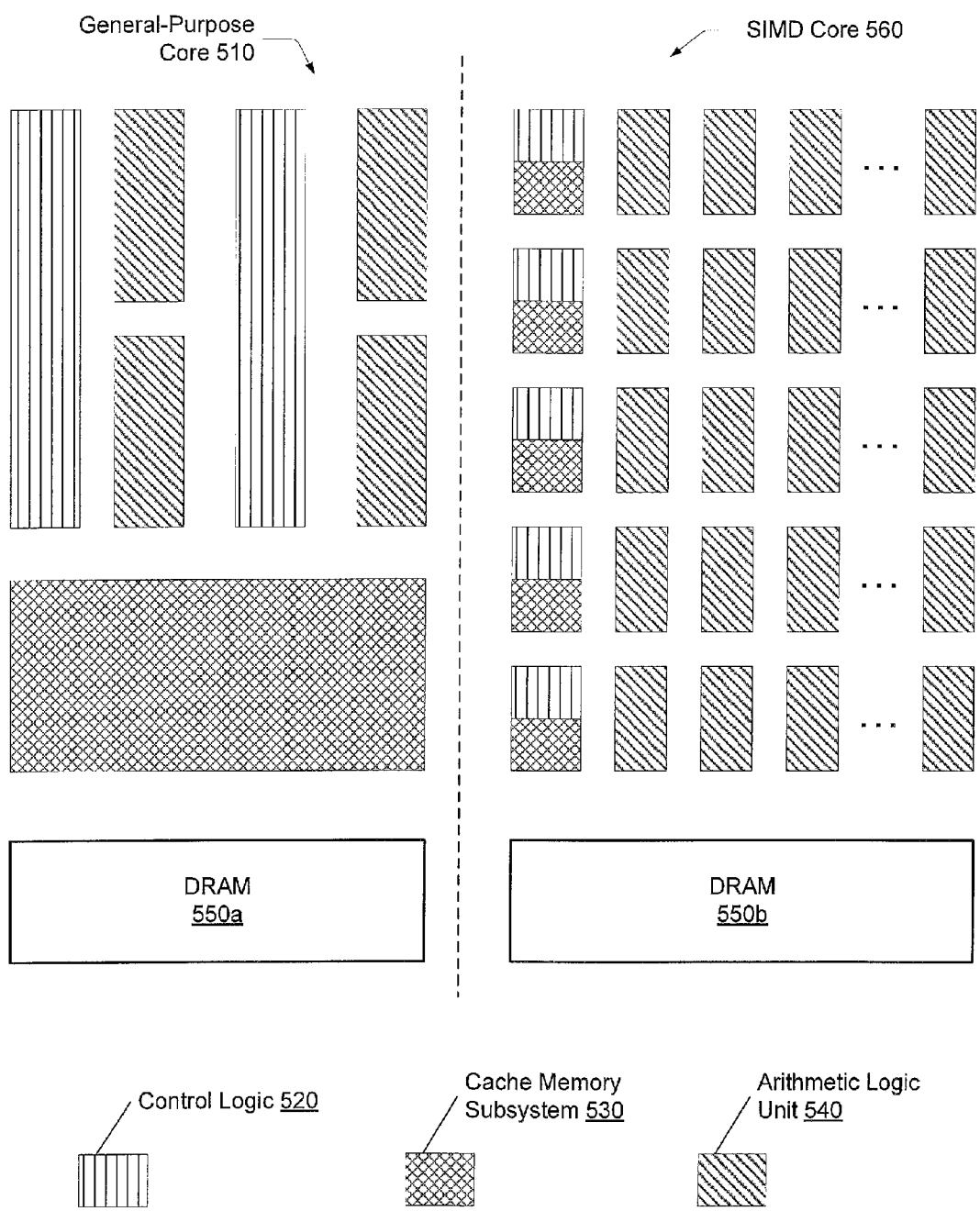
FIG. 5 is a generalized block diagram of one embodiment of a logical layout of micro-architectures for two types of processor cores.

Referring to FIG. 5, a generalized block diagram illustrating one embodiment of a logical layout of micro-architectures for two types of processor cores is shown. Although each of a general-purpose core 510 and a single instruction multiple data (SIMD) core 560 is shown, other types of heterogeneous cores are possible and contemplated. Each of the cores 510 and 560 have a dynamic random access memory (DRAM) 550a and 550b for storage of data and instructions. In one embodiment, the cores 510 and 560 share a same DRAM. In another embodiment, a given level of a cache memory subsystem (not shown) is shared in addition to the DRAM. For example, referring again to FIG. 1, the cache memory subsystem 118 is shared by the cores 112 and 172.

Each of the cores 510 and 560 may include a cache memory subsystem 530. As shown, the general-purpose core 510 logically has the cache memory subsystem 530 separate from the control logic 520 and the arithmetic logic units (ALUs) 540. The data flow within the core 510 may be pipelined, although storage elements, such as pipeline registers, are not shown in order to simplify the illustration. In a given pipeline stage, an ALU may be unused if instructions in this stage do not utilize a certain type of ALU or if another work unit (or another thread for a general-purpose core) consumes the ALUs during this stage.

As shown, the SIMD core 560 has the cache memory subsystem 530 grouped with control logic 520 for each row of computation units 542. The data flow within the core 560 may be pipelined, although storage elements, such as pipeline registers, are not shown in order to simplify the illustration. In a given pipeline stage, a computation unit may be unused if an associated instruction in this stage is not executed based on a previous failed test, such as a not-taken branch.

Figure 6:
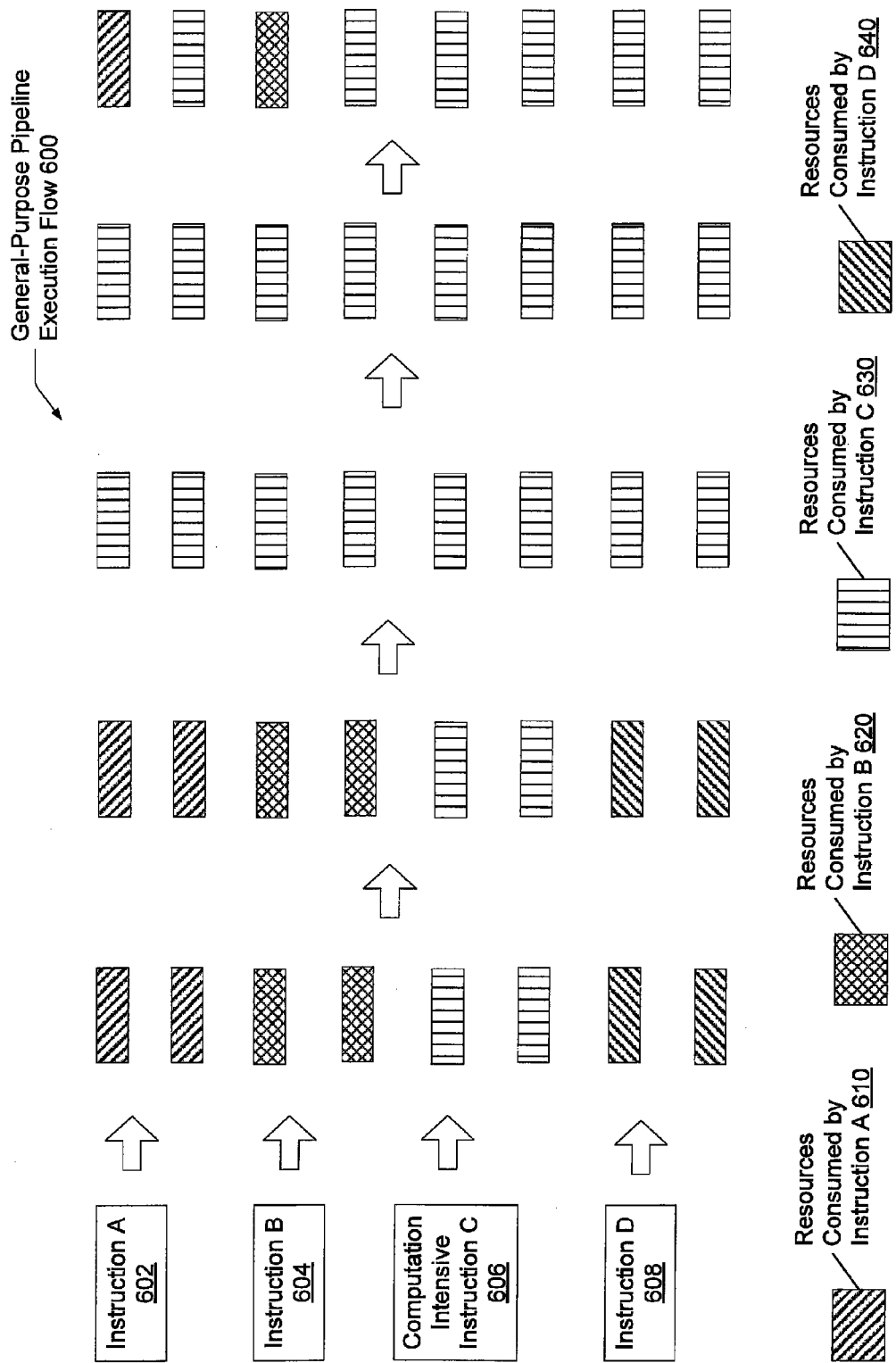
FIG. 6 is a generalized block diagram of one embodiment of a general-purpose pipeline execution flow.

Referring now to FIG. 6, a generalized block diagram illustrating one embodiment of a general-purpose pipeline execution flow 600 is shown. Instructions 602-608 may be fetched and enter a general-purpose pipeline. Instruction 606 may be a computation intensive instruction. During particular stages of the pipeline execution flow, one or more of the instructions 602-608 consume resources in the general-purpose processor core 112, such as decoder logic, instruction scheduler entries, reorder buffer entries, ALUs, register file entries, branch prediction units, and so forth.

In a balanced scheme, each of the instructions 602-608 consume an equal amount of resources each stage. However, typically, a general-purpose core does not replicate resources for each instruction due to semiconductor real-estate cost, power consumption and other design considerations. Therefore, the workload may become unbalanced. For example, the instruction 606 may consume more resources for one or more pipe stages due to its computation intensive behavior. As shown, the resources 630 consumed by this instruction may become far greater than the resources consumed by other instructions. In fact, the computation intensive instruction may block the usage of hardware resources by other instructions.

Some computation intensive tasks may place pressure on shared resources within the general-purpose core 112 shown in FIG. 1. Thus, throughput losses occur for both the computational intensive process and other processes waiting for the shared resources. In addition, some instructions may occupy the shared resource and other resources to support the computation being performed on the shared resource. Such a long latency instruction may concurrently block other processes from using several resources during a long latency.

Figure 7A:
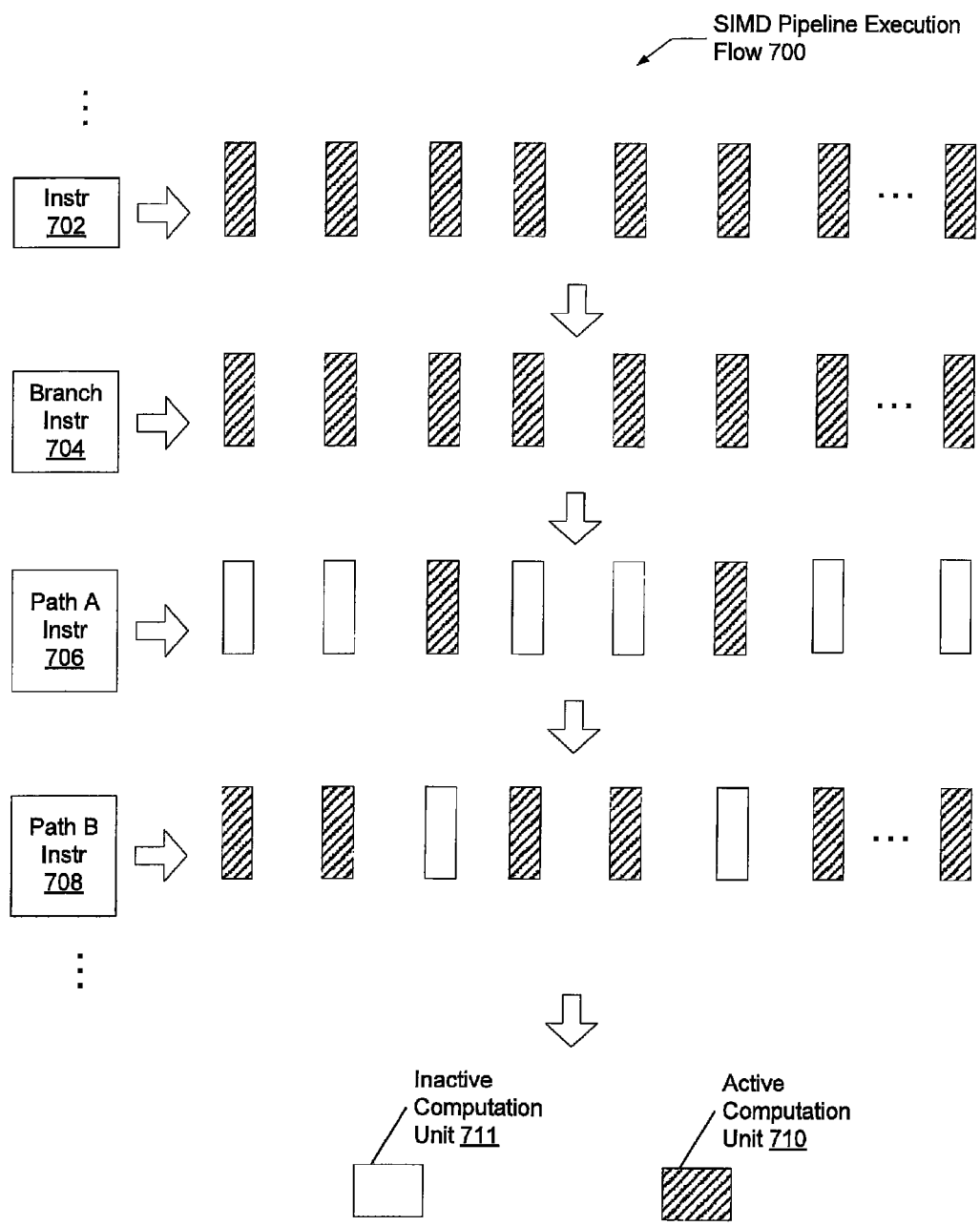
FIG. 7A is a generalized block diagram of one embodiment of a SIMD pipeline execution flow.

Referring now to FIG. 7A, a generalized block diagram illustrating one embodiment of a SIMD pipeline execution flow 700 is shown. Instructions 702-708 may be fetched and enter a SIMD pipeline with associated data. Instruction 704 may be a control flow transfer instruction, such as a conditional branch. The instruction 706 may be a first instruction in a path executed when the condition is true. The instruction 708 may be a first instruction in a path executed when the condition is false. For example, the branch instruction 704 may be associated with an IF statement in a high-level language program. The instruction 706 may be associated with a THEN statement in the high-level language program. The instruction 708 may be associated with an ELSE statement in the high-level language program.

Each of the computation units within a given row may be a same computation unit. Each of these computation units may operate on a same instruction, but different data associated with a different work unit. As shown, some of the work units pass the test provided by the conditional branch instruction 704 and other work units fail the test. The SIMD core 172 may execute each of the available paths and selectively disable the execution units, such as the computation units, corresponding to work items that did not choose the current path. For example, during execution of an If-Then-Else construct statement, within each column of a SIMD architecture are execution units configured to execute the "Then" (Path A) and the "Else" (Path B) paths. The efficiency of parallel execution may be reduced as the first and the second work units pause execution and wait as the third work unit continues with its ongoing execution. Therefore, not all of the computation units are active computation units 710 in a given row after execution of the branch instruction 704. As shown, one or more computation units are inactive computation units 711 that have been disabled for execution. If a large number of computation units are inactive during a given pipe stage, the efficiency and throughput of the SIMD core is reduced.

Figure 7B:
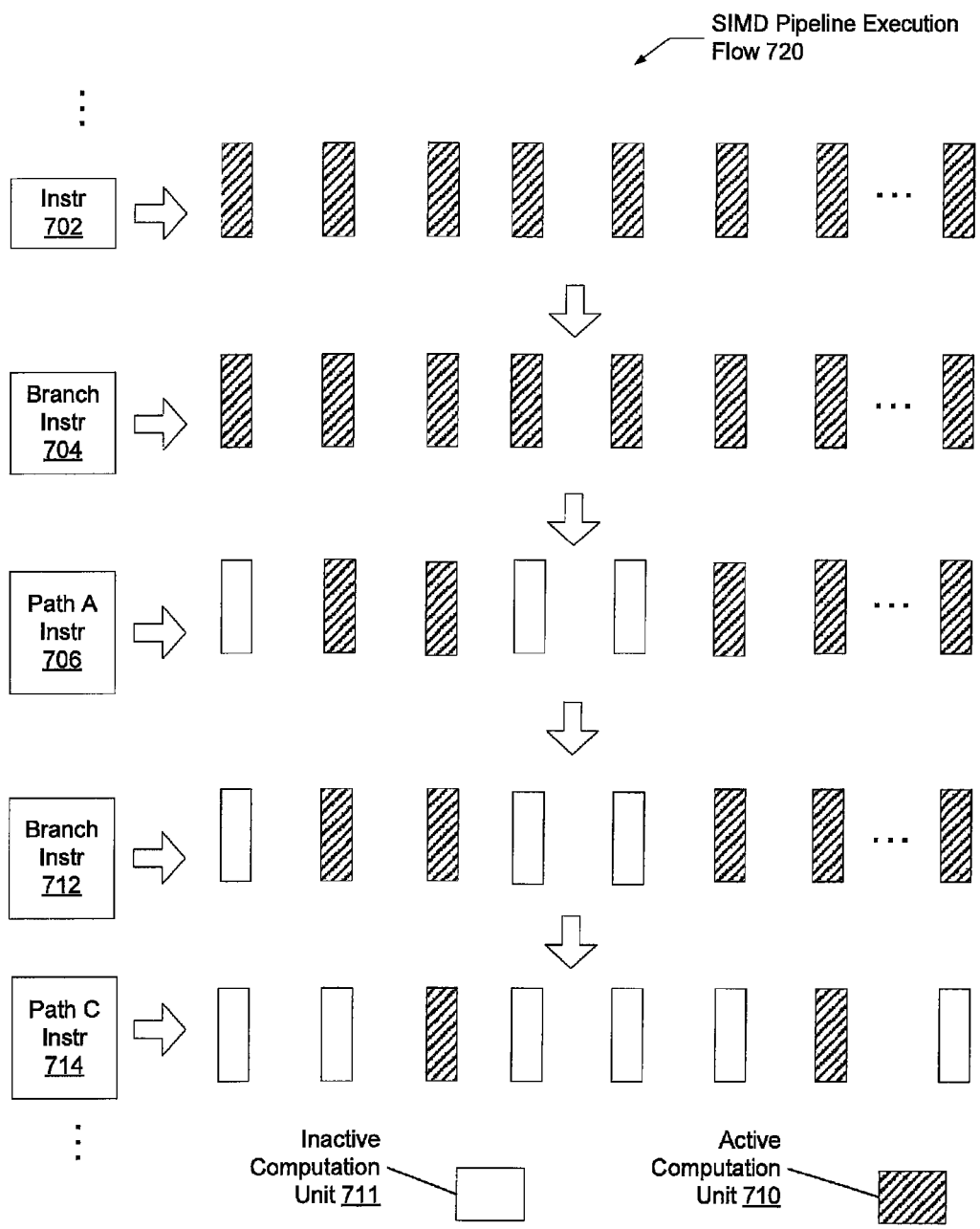
FIG. 7B is another generalized block diagram of one embodiment of a SIMD pipeline execution flow.

In one embodiment, an "Else" path is a return for the compute kernel. Execution of the compute kernel ends and the corresponding work unit becomes idle. However, neighboring work units in the SIMD core may continue executing. Referring now to FIG. 7B, a generalized block diagram illustrating another embodiment of a SIMD pipeline execution flow 720 is shown. Similar to execution flow 700, instructions 702-706 may cause one or more computation units to be disabled in a particular row of the SIMD core. Here, each "Else" path may be a return for a compute kernel. Therefore, for a given work unit, a branch resolving in a not-taken direction may cause the given work unit to cease further execution of the compute kernel. In execution flow 720, only one instruction is shown between a first branch instruction 704 and a second branch instruction 712 for ease of illustration. However, multiple instructions may be between the branch instructions 704 and 712. Regardless of the number of instructions between the branches 704 and 712, work units that resolve the first branch 704 in a not-taken direction may complete execution. Similarly for branch 712, work units that resolve the second branch in a not-taken direction may complete execution. Computation units for later stages of a SIMD core may be disabled for these work units. If a large number of computation units are inactive during a given pipe stage, the efficiency and throughput of the SIMD core is reduced.

One example of an application that may cause multiple work units to fail a test and cease execution while neighboring work units may continue is face detection. As known to those skilled in the art, face detection as implemented in OpenCv (Open Computer Vision library) is one application of the Viola-Jones object detection algorithm. The Viola-Jones algorithm exhibits a data-dependent execution pattern. A search compute kernel is applied to a record of data, which may include one or more pixels. The search compute kernel searches for faces in a sub-window of a two-dimensional (2D) or a three-dimensional (3D) image. Within the compute kernel, there may be a cascade of tests implemented as control flow transfer instructions, such as branch instructions. In one typical example, a cascade of tests comprises 22 stages, or 22 tests. This cascade of tests may determine whether an input window contains a face.

The cascade of tests in the Viola-Jones algorithm may be designed to prune unpromising paths quickly. Therefore, most work units may determine the non-existence of a face and finish. The execution of work units continues on the remaining pixels that are likely to contain a face. A small fraction of pixels (i.e. work unit executions) may continue through the 22 stages, whereas most pixels are found not to contain faces after a few initial stage tests. Even with large task parallelism, the presence of a few continuing work units on a wavefront may cause low SIMD core utilization. One method described below utilizes a separate heterogeneous core while releasing the SIMD core for further processing. This method may increase overall computing performance when it is detected that a small amount of SIMD parallelism is present.

Turning now to FIG. 8, one embodiment of code 800 including a tagged branch to define a migration point is shown. The code 800 comprises a compute kernel generally titled "foo". During execution, a portion of the code 800 may be migrated to a separate heterogeneous core. In the example shown, the outer loop is data dependent. In one embodiment, a compiler informs the SIMD core of the data dependence by using a tag bit in the branch instruction corresponding to the "while" loop test. During execution, when a condition for migration is detected, such as a measured SIMD utilization is below a given threshold, the intermediate local values may be moved to a data structure in memory to be accessed by a separate heterogeneous core. For example, a general-purpose core may continue execution of the compute kernel from the point of the tagged branch migration point. For example, the implicit conditional branch in the while statement is tagged with the label "secondary_entry". The separate heterogeneous core may use a compiler-generated data structure. In another embodiment, this data may be cached, alleviating migration costs. In one example, the live data may include both a local slice of the "tmp" array, as well as a current value of the local_temp variable. During migration, this data may be communicated to the runtime environment, which directs continued execution of the compute kernel to the secondary entry point indicated by the label "secondary_entry".

Figure 9:
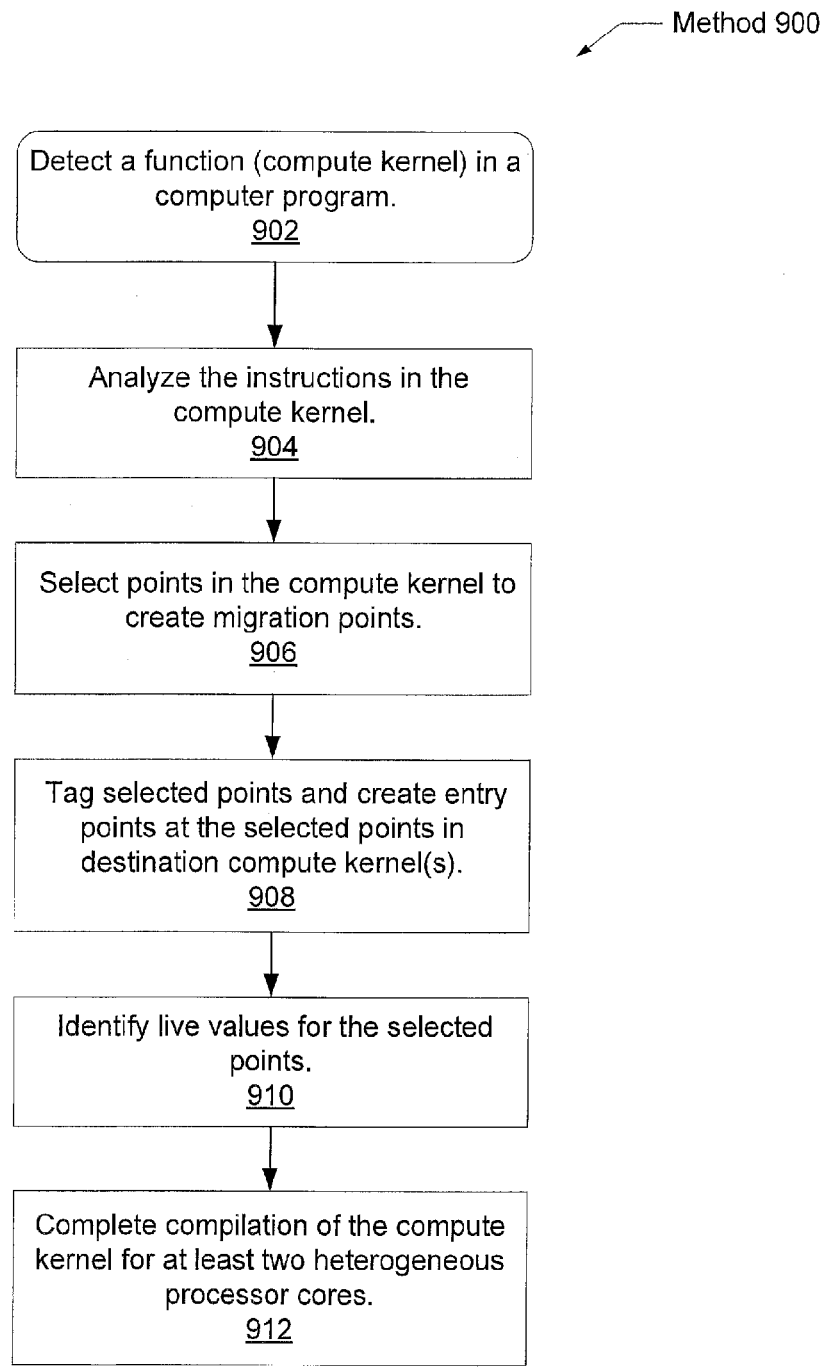
FIG. 9 is a generalized flow diagram illustrating one embodiment of a method for instrumenting code for compute kernel migration.

Turning now to FIG. 9, one embodiment of a method 900 for optimizing parallel execution of multiple work units in a processor by utilizing pre-runtime data information is shown. The components embodied in the processing node 110 and the hardware resource assignments shown in FIG. 4 described above may generally operate in accordance with method 900. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 902, a software program or subroutine may be located and analyzed. This software program may be written for compilation and execution on a heterogeneous multi-core architecture. Program code may refer to any portion of a software application, subroutine, dynamic linked library, or otherwise. A pathname may be entered at a command prompt by a user, a pathname may be read from a given directory location, or other, in order to begin compiling the source code. The program code may be written by a designer in a high-level language such as C, a C-like language such as OpenCL™, and so forth. In one embodiment, the source code is statically compiled. In such an embodiment, during a static front-end compilation, the source code may be translated to an intermediate representation (IR). A back-end compilation step may translate the IR to machine code. The static back-end compilation may perform more transformations and optimizations. In another embodiment, the source code is compiled with a Just-In-Time (JIT) method. The JIT method may generate an appropriate binary code after obtaining the system configuration. With either method, the compiler may identify a compute kernel in the program code. In one embodiment, the compiler, such as the OpenCL compiler, may generate multiple versions of compute kernels. One version of a compute kernel may be generated for each type of OpenCL device type, such as a general-purpose CPU, a SIMD GPU, and so forth.

In block 904, the compiler may read one or more instructions of the compute kernel and analyze them. A conditional statement may be a control flow transfer instruction, such as a branch. Different types of control flow transfer instructions may include forward/backward branches, direct/indirect branches, jumps, and so forth. It may be possible for a compiler or other tool to statically determine a direction of a branch and/or a target of a branch. However, in one embodiment, some processing typically performed during runtime on associated data may be performed during compilation. For example, a simple test to determine a direction (taken, not-taken) of a branch may be performed. Although, compilation may be referred to as "static compilation", one or more small dynamic operations may be performed. This compilation may also be referred to as "pre-runtime compilation". Another example of a dynamic step performed at this time is identifying a next instruction to execute in each of a THEN, ELSE IF and ELSE blocks of an If-Then-ElseIf-Else construct. For example, if a conditional branch fails, a return statement may be executed. Therefore, the compiler knows that during execution, a corresponding work unit for this computer kernel may become idle when the branch test fails.

In block 906, particular lines of code in a compute kernel are selected for creating a migration point. A migration point may be a location in the computer kernel where in-flight execution transfers to a different heterogeneous core. In one embodiment, this compute sub-kernel migration may be achieved by a mechanism similar to process migration, wherein an execution state is moved from a first heterogeneous core to a second heterogeneous core with a possibly different micro-architecture than the first core. In another embodiment, this compute sub-kernel migration may be achieved by creating multiple compute sub-kernels that are later dispatched.

In one embodiment, the compiler may automatically identify migration points. As used herein, migration points may also be referred to as switch points. The compiler may use control flow analysis. Identifying a migration point may include utilizing static control flow analysis to find data-dependent loops leading to a compute kernel exit or return. Rather than identify each branch with a path including an exit or return, the compiler may use a count to reduce a number of migration points. For example, the first five branches found in a compute kernel may not be candidates for tagging as a migration point. Every third branch after the first five branches may be candidates for tagging as a migration point. Other filtering algorithms based on a count are possible and contemplated.

In addition, the compiler may use profile input from previous executions to identify migration points. For example, a conditional test associated with a given branch may fail for a number of records of data above a given threshold. Therefore, this branch may be identified as a migration point. Further, programmer annotations to indicate migration points may be added as "pragmas" or as an extension to the OpenCL framework.

In block 908, the compiler may tag the selected points in the code for each version of the compiled code. Each version may be referred to as a destination compute kernel for a respective OpenCL device. Again, the compiler may compile an identified compute kernel to produce two or more versions of compiled code, each capable of running on a respective one of the OpenCL devices. Referring again to code 800 in FIG. 9, the secondary entry point indicated by the label "secondary_entry" is an example of a migration tag for a branch. A code generator within the compiler may insert the tag and insert other code to invoke the live values during migration. Invoking the live values may include transferring the live values to a destination OpenCL device and initializing the values on the destination OpenCL device. The code generating and inserting process may be similar to debugger code being inserted at debut points and instrumentation for measuring dynamic behavior.

In one embodiment, a compute kernel may be tagged to identify migration points as described above. In another embodiment, the compute kernel may be divided into multiple compute sub-kernels that are scheduled and dispatched independently. Runtime profile information or compiler static estimation may be used to determine pass/fail statistics for conditional tests implemented by branch instructions. A "hot" execution path may comprise a large number of passes above a given threshold of the conditional test for multiple records of data. A "cold" execution path may comprise a small number of passes below a second given threshold of the conditional test for multiple records of data. A compute kernel may be divided into compute sub-kernels based on the "hot" and "cold" execution paths.

Generation of the corresponding compute sub-kernels may utilize similar runtime code generation mechanisms in addition to creation of a corresponding execution range (NDRange) for those compute sub-kernels, such as the "cold" execution paths, that continue execution on a general-purpose core. This may be done by creating a potentially sparse array containing the compute sub-kernel identifiers (IDs), which may utilize an OpenCL designation, to be executed on the general-purpose core. A given compute kernel may utilize indirect access to this array to identify a proper compute sub-kernel and later work unit. Alternatively, the compiler may generate a list of these IDs, and a corresponding compute sub-kernel to be invoked and mapped for each of the executing work units.

After a profile run or a static estimation, a compute sub-kernel corresponding to a "hot" execution path may be compiled for a SIMD core. A compute sub-kernel corresponding to a "cold" execution path may be compiled for a general-purpose core. The early stages of a cascade of tests may have a high probability of passing. Therefore, these execution paths may be implemented in the "hot" compute sub-kernels executed on the SIMD core. After execution of these particular "hot" compute sub-kernels, the associated produced data may be moved in memory. This data movement promotes the local data that is live to global data. The work units corresponding to the "hot" compute sub-kernels may write a bit array based on its work unit ID to indicate whether an associated "cold" compute sub-kernel subsequently continues execution on a general-purpose core.

In block 910, the compiler identifies a set of live values at the identified migration points. The live values may include intermediate computation values and local arrays. Referring again to code 800 in FIG. 8, the live data may include both a local slice of the "tmp" array within the code, as well as a current value of the local_temp variable. If migration occurs later during execution of an associated work unit, the live values may be transferred and initialized on a destination OpenCL device. As described above, the code generator within the compiler may insert the tag and insert other code to invoke the live values during migration. At the destination OpenCL device, code generation for migration entry points initializes data structures containing live values and proceeds with kernel execution. Alternatively, the compiler may create compute sub-kernels to proceed with the execution as described above. In block 912, the compiler completes compilation of the compute kernel for at least two heterogeneous processor cores. Other debug and instrumentation code may be inserted.

In one embodiment, the compiler generates multiple data structures. Two or more data structures include executable object code for each compute sub-kernel on a given target OpenCL device, such as a general-purpose core and a SIMD core. Another data structure includes the live data to be transferred and accessed at the time of migration. Given a label designated as a potential migration point in a compute kernel, the compiler utilizes data flow analysis to determine live values that may be transferred. Live values that are not defined at that point in the execution, such as being cached in a register, are placed in a location accessible to a runtime environment. Examples of these locations include associated original memory locations and registers that hold contents that are preserved. In one embodiment, a heuristic check may be utilized to determine whether the size of the data transfer allows a profitable change execution between heterogeneous cores.

Additionally the compiler may generate another data structure that is interpreted by the runtime environment to transfer the live data to an associated destination OpenCL device. This data structure may provide the locations and sizes of the live data to be transferred and their locations in an address space of both the source and destination OpenCL devices. Also, the compiler generates a corresponding version of the kernel for the destination device. The respective compiled code for each of the OpenCL devices accesses the live data at the designated locations and begins execution at the migration points.

Figure 10:
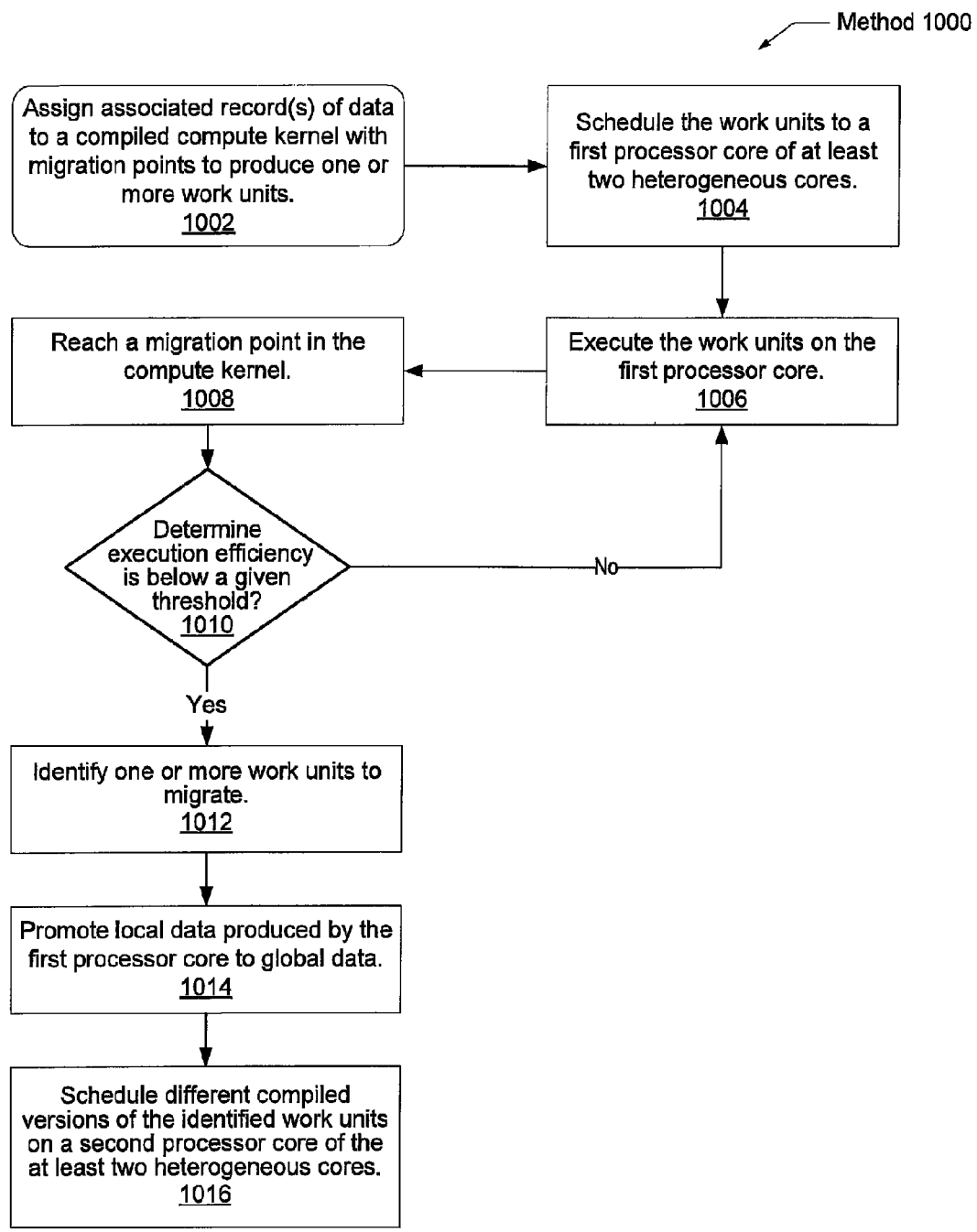
FIG. 10 is a generalized flow diagram illustrating one embodiment of a method for migrating a compute kernel during program execution.

Turning now to FIG. 10, one embodiment of a method 1000 for optimizing parallel execution of multiple work units in a processor by utilizing pre-runtime data information is shown. The components embodied in the processing node 110 and the hardware resource assignments shown in FIG. 4 described above may generally operate in accordance with method 1000. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 1002, an associated record of data is assigned to each work unit of a given compute kernel. In block 1004, the OS scheduler 424 schedules the work units to heterogeneous cores. In block 1006, the heterogeneous processor cores execute the corresponding scheduled work units.

In block 1008, a given tagged migration point is reached. In one embodiment, a measurement of the utilization of a currently used OpenCL device may be performed. If the measurement indicates the utilization or performance is below a given threshold, then the associated compute kernel or compute sub-kernel may be migrated to another OpenCL device, such as a heterogeneous core with a different micro-architecture. In one embodiment, this measurement is a count of a number of currently executing work units on a SIMD core that reached an exit or return within an associated compute kernel or compute sub-kernel. Alternatively, a count of a number of disabled computation units in a wavefront may provide the same number. If this count is above a given threshold, then the work units that have not yet reached an exit point may be migrated to another heterogeneous core, such as a general-purpose core. Then the wavefront on the SIMD core may be released and is available for other scheduled work units.

In other embodiments, the above technique may be extended to initiate migrations at any situation in which it is determined that a large fraction of the parallel executing work units in a wavefront on a SIMD core are idle and the remaining work units are expected to continue substantial execution. For example, the generated data structures may be in shared memory and in one or more caches. In a system with virtual memory support, a subset of the work units may hit the cache whereas the remaining work units experience virtual memory misses, which are long latency events. In this case, overall computing performance may be better with continued execution on a general-purpose core since further execution may benefit from prefetching techniques enabled by the current execution.

If execution efficiency is not determined to be below a given threshold (conditional block 1010), then control flow of method 1000 returns to block 1006 and execution continues. If execution efficiency is determined to be below a given threshold (conditional block 1010), then in block 1012, one or more work units are identified to migrate to a second processor core with a micro-architecture different from a micro-architecture of the first processor core. The identified work units may have caused the above measurement to be below the given threshold. In block 1014, the associated local data produced by the first processor core is promoted to global data. In block 1016, the compiled versions of the migrated work units are scheduled to be executed on the second processor core beginning at the migration tagged point.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool which may synthesize the description to produce a netlist comprising a list of gates from a synthesis library. The netlist comprises a set of gates which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   identifying, during compilation of a compute kernel, a location within the compute kernel comprising a plurality of instructions at which execution of the compute kernel may migrate during execution of the compute kernel;
   creating a data structure to maintain and migrate a context of the compute kernel;
   scheduling code in the compute kernel prior to the location for execution on a first processor core with a first micro-architecture;
   in response to receiving an indication that a condition for migration is satisfied:
   moving the context to a location accessible by a second processor core with a second micro-architecture different from the first micro-architecture; and
   scheduling code in the compute kernel after the location to the second processor core;
   wherein to determine that a condition for migration is satisfied, the method further comprises determining a number of parallel executing iterations of the compute kernel that have reached an exit point is above a given threshold.

2. The method as recited in claim 1, further comprising generating first version of code for the compute kernel corresponding to the first processor core, and generating a second version of code for the compute kernel corresponding to the second processor core.

3. The method as recited in claim 2, wherein the first micro-architecture is a single instruction multiple data (SIMD) micro-architecture and the second micro-architecture is a general-purpose micro-architecture.

4. The method as recited in claim 2, further comprising performing said identifying is based at least on one of the following: profile runtime information and static information.

5. The method as recited in claim 2, further comprising:
   instrumenting a first version of code for the first processor core with instructions to determine whether the condition for migration is satisfied; and
   instrumenting a second version of code for the second processor core with instructions to find live values at locations indicated by the data structure and begin execution.

6. The method as recited in claim 1, wherein the location is immediately prior to a conditional branch instruction.

7. A computing system including a heterogeneous multi-core architecture comprising:
   a first processor core with a first micro-architecture;
   a second processor core with a second micro-architecture different from the first micro-architecture;
   a compute kernel comprising a plurality of instructions, including a location within the compute kernel at which execution of the computer kernel may migrate during execution of the computer kernel;
   a data structure usable to maintain and migrate a context of the compute kernel;
   an operating system comprising a scheduler, wherein the scheduler is configured to:
   schedule code in the compute kernel prior to the location for execution on a first processor core with a first micro-architecture;

in response to receiving an indication that a condition for migration is satisfied:
    move the context to a location accessible by a second processor core with a second micro-architecture different from the first micro-architecture; and
    schedule code in the compute kernel after the location to the second processor core;
wherein to determine that a condition for migration is satisfied, each of the first and the second processor core is configured to determine a number of parallel executing iterations of the compute kernel that have reached an exit point is above a given threshold.

8. The computing system as recited in claim 7, further comprising a compiler further configured to generate a first version of code for the compute kernel corresponding to the first processor core, and generate a second version of code for the compute kernel corresponding to the second processor core.

9. The computing system as recited in claim 8, wherein the first micro-architecture is a single instruction multiple data (SIMD) micro-architecture and the second micro-architecture is a general-purpose micro-architecture.

10. The computing system as recited in claim 8, wherein the compiler is further configured to perform said identifying based at least on one of the following: profile runtime information and static information.

11. The computing system as recited in claim 8, wherein the compiler is further configured to:
    instrument a first version of code for the first processor core with instructions to determine whether the condition for migration is satisfied; and
    instrument a second version of code for the second processor core with instructions to find live values at locations indicated by the data structure and begin execution.

12. The computing system as recited in claim 7, wherein the compiler is further configured to:
    split the compute kernel into two compute sub-kernels at the given location, in response to predicting a number of later parallel executing iterations of the compute kernel satisfy said condition for migration;
    schedule a first compute sub-kernel to the first processor core, wherein the first compute sub-kernel comprises code before the location; and
    schedule a second compute sub-kernel to the second processor core, wherein the second compute sub-kernel comprises code after the location.

13. The computing system as recited in claim 7, wherein the location is immediately prior to a conditional branch instruction.

14. A non-transitory computer readable storage medium storing program instructions, wherein the program instructions are executable to:
    identify, during compilation of a compute kernel, a location within the compute kernel comprising a plurality of instructions at which execution of the compute kernel may migrate during execution of the compute kernel;
    create a data structure to maintain and migrate a context of the compute kernel;
    schedule code in the compute kernel prior to the location for execution on a first processor core with a first micro-architecture;
    in response to receiving an indication that a condition for migration is satisfied:
        move the context to a location accessible by a second processor core with a second micro-architecture different from the first micro-architecture; and
        schedule code in the compute kernel after the location to the second processor core;
    wherein to determine that a condition for migration is satisfied, the program instructions are further executable to determine a number of parallel executing iterations of the compute kernel that have reached an exit point is above a given threshold.

15. The non-transitory computer readable storage medium as recited in claim 14, wherein the program instructions are further executable to generate a first version of code for the compute kernel corresponding to the first processor core, and generating a second version of code for the compute kernel corresponding to the second processor core.

16. The non-transitory computer readable storage medium as recited in claim 14, wherein the program instructions are further executable to:
    instrument a first version of code for the first processor core at the location with instructions to determine whether the condition for migration is satisfied; and
    instrument a second version of code for the second processor core at the location with instructions to find live values at locations indicated by the data structure and begin execution.

17. A method comprising:
    identifying, during compilation of a compute kernel, a location within the compute kernel comprising a plurality of instructions at which execution of the compute kernel may migrate during execution of the compute kernel;
    creating a data structure to maintain and migrate a context of the compute kernel;
    splitting the compute kernel into two compute sub-kernels at the location, in response to predicting a number of later parallel executing iterations of the compute kernel satisfy said condition for migration;
    scheduling a first compute sub-kernel to the first processor core, wherein the first compute sub-kernel comprises code before the given location; and
    scheduling a second compute sub-kernel to the second processor core, wherein the second compute sub-kernel comprises code after the given location.

18. A computing system including a heterogeneous multi-core architecture comprising:
    a first processor core with a first micro-architecture;
    a second processor core with a second micro-architecture different from the first micro-architecture;
    a compute kernel comprising a plurality of instructions, including a location within the compute kernel at which execution of the computer kernel may migrate during execution of the computer kernel;
    a data structure usable to maintain and migrate a context of the compute kernel;
    a compiler configured to split the compute kernel into two compute sub-kernels at the location, in response to predicting a number of later parallel executing iterations of the compute kernel satisfy a condition for migration;
    an operating system comprising a scheduler, wherein the scheduler is configured to:
    schedule a first compute sub-kernel to the first processor core, wherein the first compute sub-kernel comprises code before the location; and
    schedule a second compute sub-kernel to the second processor core, wherein the second compute sub-kernel comprises code after the location.

* * * * *

UNITED STATES PATENT AND TRADEMARK OFFICE
CERTIFICATE OF CORRECTION

PATENT NO. : 8,683,468 B2  
APPLICATION NO. : 13/108438  
DATED : March 25, 2014  
INVENTOR(S) : Breternitz et al.

Page 1 of 1

It is certified that error appears in the above-identified patent and that said Letters Patent is hereby corrected as shown below:

In the Claims:

Column 16, Claim 7, Line 59, delete "computer kernel" and insert -- compute kernel --.

Column 16, Claim 7, Line 60, delete "computer kernel" and insert -- compute kernel --.

Column 18, Claim 18, Line 49, delete "computer kernel" and insert -- compute kernel --.

Column 18, Claim 18, Line 50, delete "computer kernel" and insert -- compute kernel --.

Signed and Sealed this
Nineteenth Day of January, 2016

Michelle K. Lee
*Director of the United States Patent and Trademark Office*